US012092035B2

(12) United States Patent
Prakash et al.

(10) Patent No.: US 12,092,035 B2
(45) Date of Patent: Sep. 17, 2024

(54) GAS TURBINE FIRE DETECTION SYSTEM INCLUDING COOLING SYSTEM UPSTREAM OF ASPIRATING SMOKE DETECTOR, AND RELATED METHOD

(71) Applicant: General Electric Company, Schenectady, NY (US)

(72) Inventors: Rajan Prakash, Bangalore (IN); Shivani Agarwal, Noida (IN)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/148,199

(22) Filed: Dec. 29, 2022

(65) Prior Publication Data

US 2024/0133344 A1 Apr. 25, 2024
US 2024/0229718 A9 Jul. 11, 2024

(30) Foreign Application Priority Data

Oct. 19, 2022 (IN) .............................. 202211059721

(51) Int. Cl.
*F02C 7/25* (2006.01)
*F02C 7/057* (2006.01)
(Continued)

(52) U.S. Cl.
CPC ............... *F02C 7/25* (2013.01); *F02C 7/057* (2013.01); *F02C 7/12* (2013.01); *F23N 5/022* (2013.01);
(Continued)

(58) Field of Classification Search
CPC ... F02C 7/25; F23N 5/022; F23N 5/08; F23N 5/082; F23N 5/242; F23N 2231/06; F23N 2241/20
See application file for complete search history.

(56) References Cited

U.S. PATENT DOCUMENTS 11,244,551 B2 2/2022 Escofet Via
2022/0235641 A1 7/2022 Zhang et al.

FOREIGN PATENT DOCUMENTS

CN 108131320 A 6/2018
CN 215733037 U 2/2022
(Continued)

OTHER PUBLICATIONS

English translation of JP2007299354 (Year: 2007).*
English translation of JPH11154289 (Year: 1999).*
(Continued)

*Primary Examiner* — Scott J Walthour
(74) *Attorney, Agent, or Firm* — Charlotte Wilson; James Pemrick; Hoffman Warnick LLC

(57) ABSTRACT

A fire detection system for a gas turbine system including fire risk zones is provided. The system includes a pipe intake port proximate to each of the fire risk zones within a gas turbine system enclosure, and a manifold in fluid communication with the pipe intake port. A temperature sensor is positioned in the manifold upstream of a cooling system. The cooling system reduces a temperature of a gas flow in the manifold, allowing use of an aspirating smoke detector. An aspirating smoke detector, which is downstream of the cooling system, draws in the gas flow and detects smoke in the gas flow. A controller generates a first alarm in response to the temperature sensor detecting a temperature of the gas flow exceeding a temperature threshold, or a second alarm in response to the aspirating smoke detector detecting smoke in the gas flow.

20 Claims, 7 Drawing Sheets

(51) Int. Cl.
*F02C 7/12* (2006.01)
*F23N 5/02* (2006.01)
*F23N 5/24* (2006.01)

(52) U.S. Cl.
CPC .......... *F23N 5/242* (2013.01); *F23N 2231/06* (2020.01); *F23N 2241/20* (2020.01)

(56) References Cited

FOREIGN PATENT DOCUMENTS

| CN | 216053244 U | 3/2022 |
| JP | H11154289 A | 6/1999 |
| JP | 2007299354 A | 11/2007 |

OTHER PUBLICATIONS

International Search Report and Written Opinion in PCT/US2023/076768, mailed Feb. 6, 2024, 11 pages.

\* cited by examiner

GAS TURBINE FIRE DETECTION SYSTEM INCLUDING COOLING SYSTEM UPSTREAM OF ASPIRATING SMOKE DETECTOR, AND RELATED METHOD

BACKGROUND OF THE DISCLOSURE

The disclosure relates generally to gas turbine systems and, more particularly, to systems for detecting fire inside an enclosure of a gas turbine system, and related methods.

Gas turbine systems include a compressor section, a combustion section, and a turbine section (e.g., an expansion turbine). Compressed air is provided from the compressor section to the combustion section. The air entering the combustor(s) of the combustion section is mixed with fuel and combusted. Hot gases of combustion flow from the combustion section to the turbine section to drive the gas turbine and generate power. Gas turbine systems, such as those used for electrical power generation, are generally housed in enclosures. A typical enclosure includes four sidewalls that surround the gas turbine system and a roof or top wall fastened to the four sidewalls about the periphery of the roof. The roof and sidewalls thus form a generally hollow, rectangular enclosure.

Fire within the gas turbine enclosure requires special consideration because of safety concerns. Fire detection in proximity to fire risk zones such as fueling areas or the combustor, the latter of which typically includes a plurality of combustors, is preferred for early detection and corrective action. Aspirating smoke detectors continuously draw gas (e.g., air) through pipe(s) to detect smoke using a nephelometer that detects smoke particles suspended in the gas by detecting scattered light in a sensing chamber through which the gas passes. Aspirating smoke detectors use, for example, infrared or laser light within the sensing chamber to detect smoke before it is visible to the human eye. Aspirating smoke detectors are advantageous because they are more sensitive and allow earlier detection of fire compared to other devices such as heat detectors, flame detectors, optical smoke detectors or ionization smoke detectors. During operation, ambient temperature inside the enclosure is in a range of 65-120° C. (~150-250° F.) or above. However, aspirating smoke detectors have a temperature limitation for intake air of, for example, about 60° C. (~140° F.). Consequently, they cannot be used to detect fire in gas turbine enclosures.

BRIEF DESCRIPTION OF THE DISCLOSURE

All aspects, examples and features mentioned below can be combined in any technically possible way.

An aspect of the disclosure provides a fire detection system for a gas turbine system including a plurality of fire risk zones, the fire detection system comprising: a pipe intake port proximate to each of the plurality of fire risk zones within an enclosure surrounding the gas turbine system; a manifold in fluid communication with at least one of the pipe intake ports; a first temperature sensor positioned in the manifold; a cooling system downstream of the first temperature sensor in the manifold, the cooling system configured to reduce a temperature of a gas flow in the manifold; an aspirating smoke detector downstream of the cooling system in the manifold, the aspirating smoke detector configured to draw the gas flow through the manifold and detect smoke in the gas flow; and a controller in communication with the first temperature sensor and the aspirating smoke detector, the controller configured to generate one of: a) a first alarm in response to the first temperature sensor detecting a temperature of the gas flow exceeding a first temperature threshold, and b) a second alarm in response to the aspirating smoke detector detecting smoke in the gas flow.

Another aspect of the disclosure includes any of the preceding aspects, and further comprises a safety system including: a valve in the manifold upstream of the cooling system; and a second temperature sensor in the manifold downstream of the cooling system and upstream of the aspirating smoke detector, and wherein the controller is further configured to generate a third alarm in response to the second temperature sensor detecting a temperature of the gas flow exceeding a second temperature threshold.

Another aspect of the disclosure includes any of the preceding aspects, and the controller is further configured to close the valve and to shut off the aspirating smoke detector in response to the second temperature sensor detecting the temperature of the gas flow exceeding the second temperature threshold.

Another aspect of the disclosure includes any of the preceding aspects, and the first alarm includes one of: an excessive heat detection alarm, a fire pre-alarm, and a fire alarm.

Another aspect of the disclosure includes any of the preceding aspects, and the second alarm includes one of: a smoke detection alarm, a fire pre-alarm, and a fire alarm.

Another aspect of the disclosure includes any of the preceding aspects, and further comprising a filter upstream of the aspirating smoke detector.

Another aspect of the disclosure includes any of the preceding aspects, and the plurality of fire risk zones include an area proximate to at least some of a plurality of combustor cans of the gas turbine system.

Another aspect of the disclosure includes any of the preceding aspects, and the plurality of fire risk zones further includes an area proximate to at least one fuel module of the gas turbine system.

Another aspect of the disclosure includes any of the preceding aspects, and the manifold extends outside the enclosure; and wherein the first temperature sensor, the cooling system, the aspirating smoke detector, and the controller are outside of the enclosure.

Another aspect of the disclosure includes any of the preceding aspects, and the manifold includes a plurality of manifolds, each manifold in fluid communication with at least one intake port and including a respective first temperature sensor, cooling system and aspirating smoke detector, and wherein the controller is in communication with each respective first temperature sensor and each respective aspirating smoke detector, the controller configured to generate one of: a) the first alarm in response to any of the first temperature sensors detecting a temperature of the gas flow in a respective manifold exceeding the first temperature threshold, and b) the second alarm in response to any aspirating smoke detector detecting smoke in the gas flow in a respective manifold.

Another aspect of the disclosure includes a fire detection system for a gas turbine system including a plurality of fire risk zones, the fire detection system comprising: a pipe intake port proximate to each of the plurality of fire risk zones within an enclosure surrounding the gas turbine system; at least one manifold in fluid communication with at least one of the pipe intake ports; a first temperature sensor positioned in each manifold; a cooling system downstream of the first temperature sensor in each manifold, the cooling system configured to reduce a temperature of a gas flow in a respective manifold; a valve in each manifold upstream of a respective cooling system; an aspirating smoke detector downstream of the cooling system in each manifold, the aspirating smoke detector configured to create a respective gas flow through a respective manifold and detect smoke in the respective gas flow; and a controller in communication with each first temperature sensor and the aspirating smoke detector, the controller configured to generate one of: a) a first alarm in response to any first temperature sensor detecting a temperature of the gas flow exceeding a first temperature threshold, and b) a second alarm in response to any aspirating smoke detector detecting smoke in the respective gas flow; and wherein the controller is further configured to close a respective valve and to shut off the aspirating smoke detector in response to the second temperature sensor detecting the temperature of the gas flow in the respective manifold exceeding the second temperature threshold.

Another aspect of the disclosure includes any of the preceding aspects, and further comprising a safety system including: a second temperature sensor in each manifold downstream of a respective cooling system and upstream of the aspirating smoke detector, and wherein the controller is further configured to generate a third alarm in response to the respective second temperature sensor detecting a temperature of the gas flow exceeding the second temperature threshold.

Another aspect of the disclosure includes any of the preceding aspects, and wherein, in each respective manifold, the valve is downstream of the first temperature sensor.

Another aspect of the disclosure includes any of the preceding aspects, and the first alarm includes one of: an excessive heat detection alarm, a fire pre-alarm, and a fire alarm; and the second alarm includes one of: a smoke detection alarm, a fire pre-alarm, and a fire alarm.

Another aspect of the disclosure includes any of the preceding aspects, and the second alarm includes one of: a smoke detection alarm, a fire pre-alarm, and a fire alarm.

Another aspect of the disclosure includes any of the preceding aspects, and further comprising a filter upstream of the aspirating smoke detector.

Another aspect of the disclosure includes any of the preceding aspects, and the plurality of fire risk zones include an area proximate to at least some of a plurality of combustor cans of the gas turbine system; an area proximate to at least one fuel modules of the gas turbine system; or both.

Another aspect relates to a method of fire detection for a gas turbine system including a plurality of fire risk zones, the method comprising: generating a gas flow in a manifold from at least one of the plurality of fire risk zones using an aspirating smoke detector; generating a first alarm in response to a first temperature sensor in the manifold detecting a temperature of the gas flow exceeding a first temperature threshold; cooling the gas flow downstream of the first temperature sensor and upstream of the aspirating smoke detector using a cooling system; and generating a second alarm in response to the aspirating smoke detector detecting smoke in the gas flow.

Another aspect of the disclosure includes any of the preceding aspects, and further comprising generating a third alarm in response to a second temperature sensor downstream of the cooling system and upstream of the aspirating smoke detector detecting a temperature of the gas flow exceeding a second temperature threshold.

Another aspect of the disclosure includes any of the preceding aspects, and further comprising, in response to the second temperature sensor detecting the temperature of the gas flow exceeding the second temperature threshold, closing a valve in the manifold upstream of the cooling system and shutting off the aspirating smoke detector to cease generation of the gas flow and detection of the smoke.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE DISCLOSURE

Figure 1:
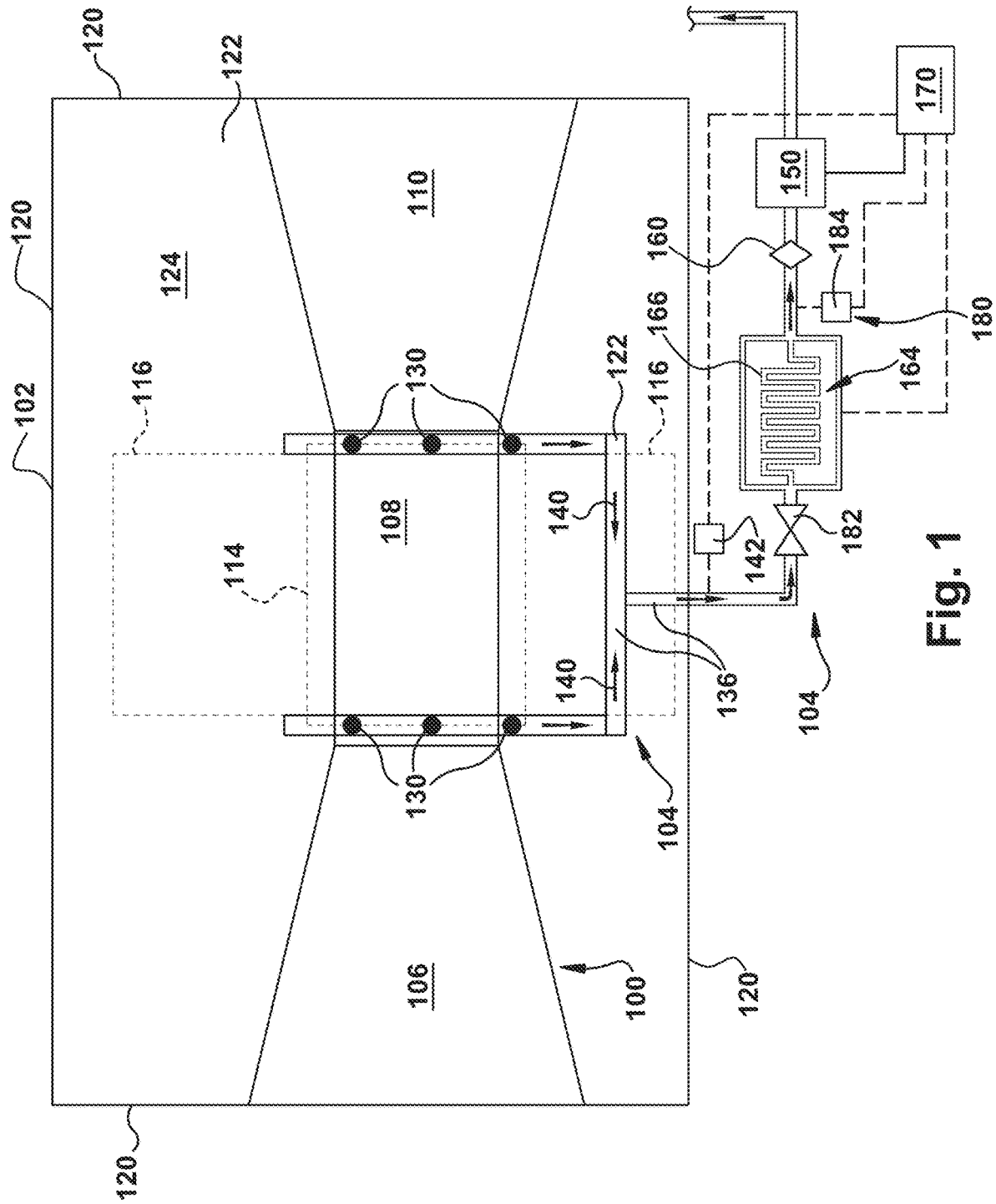
FIG. 1 shows a schematic plan view of a gas turbine system disposed in a gas turbine enclosure and including a fire detection system according to embodiments of the disclosure.

As an initial matter, in order to clearly describe the current disclosure, it will become necessary to select certain terminology when referring to and describing relevant machine components within a gas turbine enclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the ventilating fluid through the gas turbine enclosure or, for example, the flow of air through tubing. The term "downstream" corresponds to the direction of flow of the fluid, and the term "upstream" refers to the direction opposite to the flow.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure include a fire detection system for a gas turbine system including a plurality of fire risk zones. The fire detection system includes a pipe intake port proximate to each of the plurality of fire risk zones and a manifold in fluid communication with at least one of the pipe intake ports. A first temperature sensor is positioned in the manifold. A cooling system is downstream of the first temperature sensor in the manifold. The cooling system reduces a temperature of a gas flow in the manifold, allowing use of an aspirating smoke detector. An aspirating smoke detector is downstream of the cooling system and draws in the gas flow and detects smoke in the gas flow. A controller generates a first alarm in response to the first temperature sensor detecting a temperature of the gas flow exceeding a first temperature threshold, or a second alarm in response to the aspirating smoke detector detecting smoke in the gas flow. The system allows use of an aspirating smoke detector for a gas turbine system by providing the cooling system for the gas flow. The system provides earlier detection of fire than otherwise possible by using both an upstream temperature sensor and the aspirating smoke detector, improving gas turbine system safety.

Figure 2:
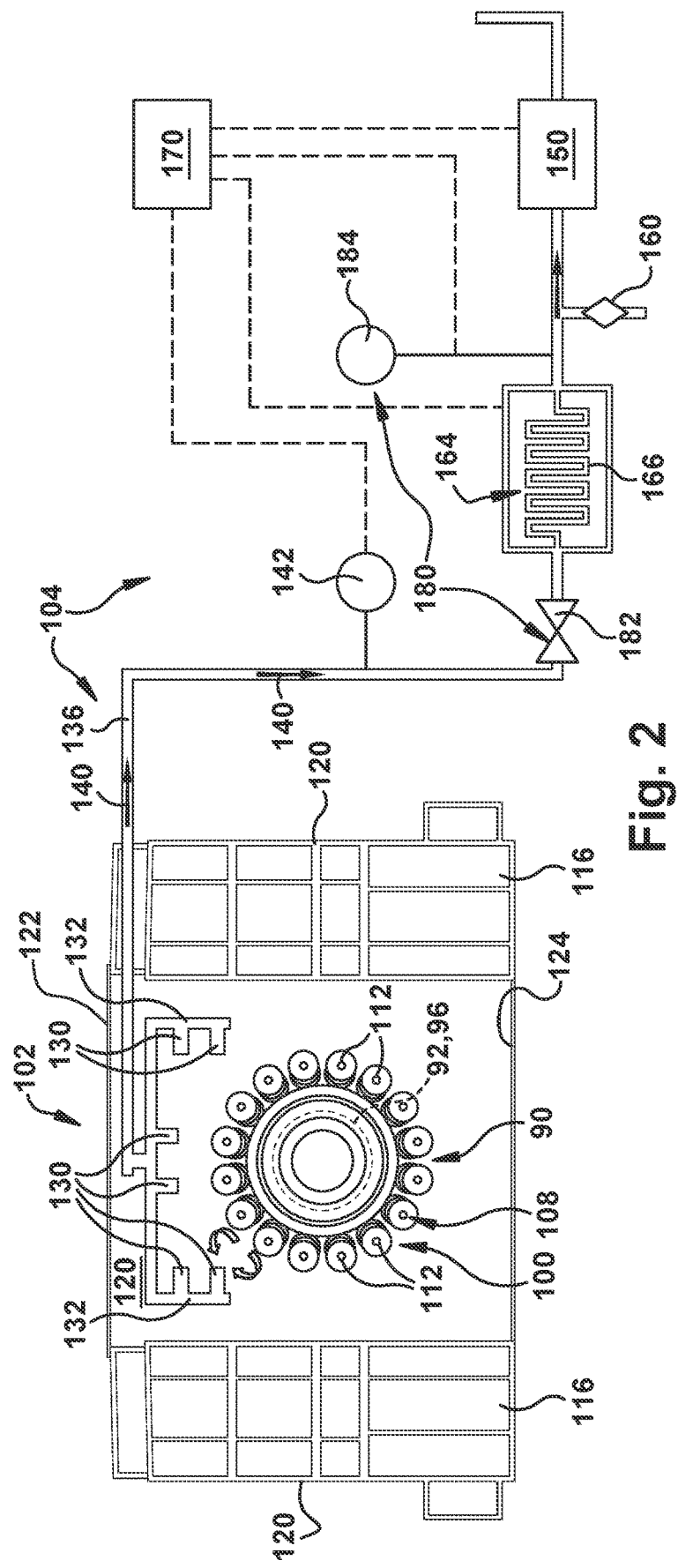
FIG. 2 shows a schematic cross-sectional view of an end of a combustion section of a gas turbine system with a fire detection system according to embodiments of the disclosure.

FIG. 1 shows a schematic plan view a gas turbine system 100 disposed in a gas turbine enclosure 102 and including a fire detection system 104 according to embodiments of the disclosure. FIG. 2 shows a schematic cross-sectional view of an end of a combustor 108 of gas turbine system 100 (hereafter "GT system 100") with fire detection system 104 according to embodiments of the disclosure. In FIGS. 1 and 2, GT system 100 is illustrated as a simple-cycle, single-shaft heavy duty gas turbine system, but it can include any variety of GT system. For purposes of description, GT system 100 may be considered as comprising a multi-stage axial flow compressor 106 having a rotating shaft (not shown). Air enters the inlet of compressor 106 and is compressed by the axial flow compressor and then is discharged to a combustor 108 where fuel, such as a gas like natural gas, a liquid fuel or a combination thereof, is burned to provide high energy combustion gases which drive a turbine 110. As shown in FIG. 2, combustor 108 may include, for example, a circular array of can-annular combustors 112 (hereafter "combustor cans 112") or it may include any other type of combustor. In a turbine 110, the energy of the hot gases is converted into work, some of which may be used to drive compressor 106 through the rotating shaft, with the remainder available for useful work to drive a load such as a generator (not shown). As understood in the art, and as shown schematically in FIG. 1, an extensive combustor fuel delivery system 114 feeds fuel to combustor 108, e.g., natural gas and/or liquid gas. Fuel delivery system 114 may include any now known or later developed fuel modules 116 (FIG. 2). The present disclosure is not limited to any one particular GT system 100 and may be implanted in connection with other turbine engines.

Gas turbine enclosure 102 encloses GT system 100. Gas turbine enclosure 102 includes sidewalls 120, a top wall 122 (shown transparent in FIG. 1), and a floor 124. GT system 100 is disposed within gas turbine enclosure 102. Fuel modules 116 may be located within or outside of gas turbine enclosure 102.

GT system 100 may include a plurality of fire risk zones. As used herein, a "fire risk zone" is any location at which fire detection is desired. A non-comprehensive list of fire risk zones of GT system 100 may include, for example: combustor can(s) 112 or other parts of combustion section 108; fuel delivery system 114 including parts thereof such as fuel modules 116 and potential fuel leak locations like pipe joints, pumps or fuel intake ports; exhaust regions of turbine section 110; and/or other regions within gas turbine enclosure 102 at which fire is a concern. For purposes of description only, certain combustor cans 112 and/or areas proximate to at least one fuel module 116 of fuel delivery system 114 (FIG. 1) of GT system 100, are identified as illustrative fire risk zones in the drawings.

Fire detection system 104 (hereafter "system 104") may include a pipe intake port 130 proximate to each of the plurality of fire risk zones. Hence, one or more pipe intake ports 130 may be provided. Pipe intake ports 130 may include any variety of opening in a pipe 132 through which a gas (e.g., air) sample can be drawn into pipe 132. For example, pipe intake ports 130 may be small opening(s) in pipe 132 adjacent a fire risk zone. As used herein, the terms "proximate to" or "adjacent" indicate that pipe intake port 130 is sufficiently close to the particular structure constituting the desired fire risk zone to ensure gas suctioned therein is indicative of fire in or about that particular structure. Pipe 132 may be routed in any manner to position pipe intake port(s) 130 near a fire risk zone. Pipe intake ports 130 may be arranged in any manner such as an array, e.g., a circular array about annularly arranged combustor cans 112.

A manifold 136 is in fluid communication with at least one of pipe intake ports 130. Manifold 136 can include a single pipe 132 and/or a chamber coupling a plurality of pipes 132 together. Manifold 136 and/or pipe(s) 132 may be any conduit capable of containing and passing a gas flow 140 (also labeled with arrows). Manifold 136 and/or pipe(s) 132 may include rigid material conduits, e.g., steel pipes, which are threaded together and held in place by mounts (not shown). In a non-limiting example, manifold 136 and/or pipe(s) 132 may have an outer diameter selected as per flow and pressure calculations. Manifold 136 and/or pipe(s) 132 may be optionally insulated in any manner to retain heat of gas flow 140.

Figure 4:
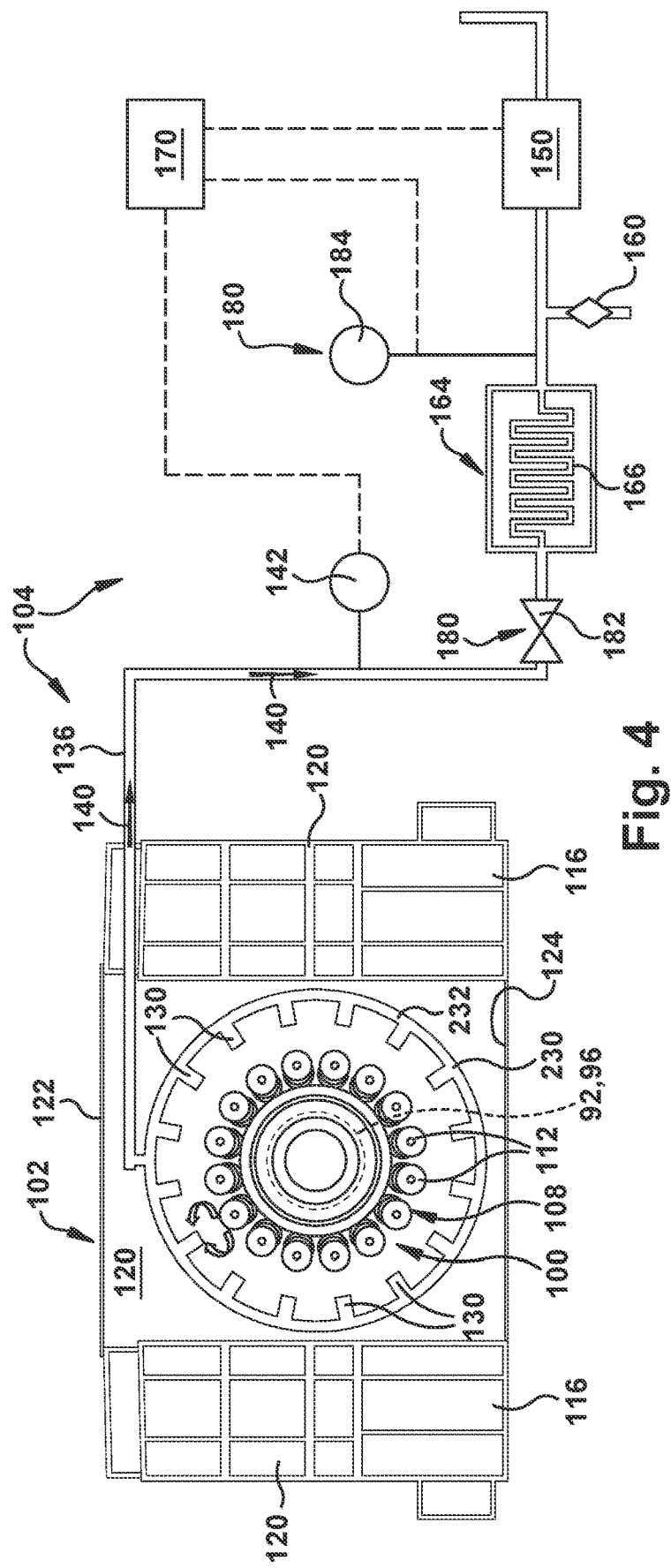
FIG. 4 shows a schematic cross-sectional view of an end of a combustion section of a gas turbine system with a fire detection system according to embodiments of the disclosure.

It is emphasized that a "plurality of fire risk zones," as used herein, may not include all fire risk zones of GT system 100 or gas turbine enclosure 102. For example, it may include some or all combustor cans 112, and it may further include an area proximate to at least one fuel module 116 of fuel delivery system 114 of GT system 100. FIGS. 1 and 2, for example, show pipe intake ports 130 adjacent just some of can combustors 112. In contrast, FIG. 4 shows pipe intake ports 130 adjacent all can combustors 112, e.g., using a single annular pipe 232. Any number of fire risk zones may be provided with a pipe intake port 130, as described herein, and the respective pipe intake ports 130 may be defined in a variety of pipe arrangements.

System 104 also includes a first, upstream temperature sensor 142 positioned in manifold 136. Upstream temperature sensor 142 has at least a part thereof operatively positioned in manifold 136 to measure a temperature of gas flow 140 in manifold 136. Upstream temperature sensor 142 may be positioned in manifold 136 in any location downstream of pipe intake port(s) 130 at which elevated temperature(s) indicative of fire can be measured. For example, upstream temperature sensor 142 may be sufficiently close to the desired fire risk zones, e.g., combustor can(s) 112, such that gas flow 140 in manifold 136 cannot lose heat below that which indicates the presence of fire. Upstream temperature sensor 142 can include any form of industrial temperature sensor capable of withstanding fire-level temperatures of gas flow 140. Upstream temperature sensor 142 may include but is not limited to: thermocouples, resistance temperature detectors (RTD), thermistors and/or semiconductor based integrated circuits. As will be described further herein, upstream temperature sensor 142 is operably coupled to a controller 170 (see dashed communications path) using any now known or later developed communications system, e.g., cellular communications, wireless, wired, or other communications network.

Figure 3:
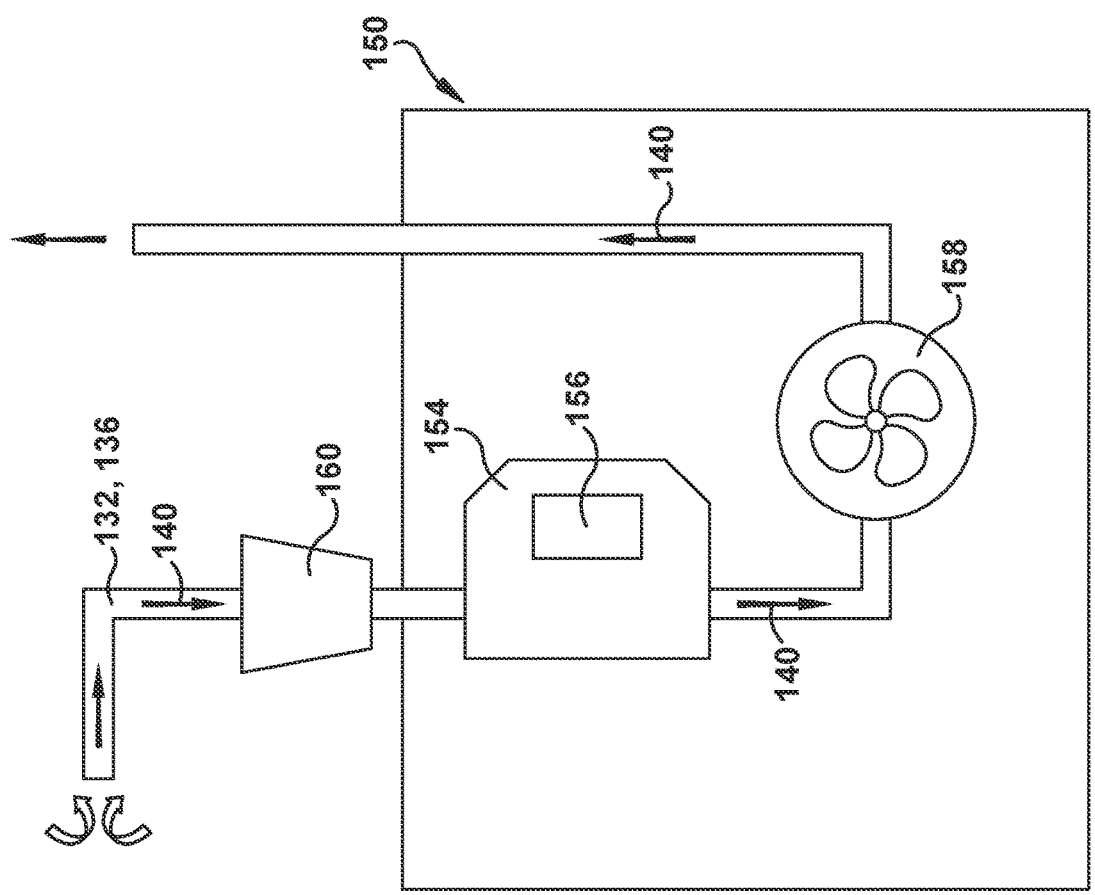
FIG. 3 shows a schematic view of an illustrative aspirating smoke detector according to embodiments of the disclosure.

System 104 includes an aspirating smoke detector (ASD) 150 downstream of a cooling system 164 (described herein) in manifold 136. ASD 150 is configured to create gas flow 140 through manifold 136 (and pipes 132, 232) and detect smoke in gas flow 140. FIG. 3 shows a schematic plan view of an illustrative ASD 150. ASD 150 may include a sensing chamber 154 including a nephelometer 156 therein, and a fan, aspirator or other form of suction device 158 (hereafter "fan 158") that generates (pulls or draws) gas flow 140 through system 104. Fan 158 may create a negative pressure (suction) inside pipe intake ports 130, pipe(s) 132, 232 and manifold 136 sufficient to draw gas flow 140 through sensing chamber 154, i.e., one or more environmental samples (air) from respective fire risk zone(s) of GT system 100. The necessary negative pressure may vary depending on many factors such as but not limited to: the number of pipe intake ports 130 (fire risk zones), diameter and length of pipes 132, 232 and/or manifold 136, and the number of corners or restrictions in pipes 132, 232 and/or manifold 136.

As understood in the field, ASD 150 continuously draws gas flow 140 (e.g., air or air with smoke) through manifold 136 (and pipe intake ports 130) to detect smoke using nephelometer 156. Nephelometer 156 detects smoke particles suspended in gas flow 140 by detecting scattered light in sensing chamber 154 through which gas flow 140 passes. ASD 150 may optionally include a filter 160 of any sort capable of removing unwanted contaminants other than that which ASD 150 detects, e.g., contaminants other than smoke. Filter 160 may remove, for example, contaminants that interfere with smoke detection, e.g., particles larger than smoke particles generated by burning of the particular fuel used in GT system 100. (Note, filter 160 is shown separate from ASD 150, but it may alternatively be part of ASD 150.)

ASD 150 may use any now known or later developed light source, for example, infrared or laser light, within sensing chamber 154 to detect smoke before it is visible to the naked eye. ASD 150 may 'detect' smoke based on any user-defined accumulation level of smoke particles in gas flow 140, e.g., a certain parts per million level. In response to ASD 150 detecting smoke, a signal is sent to controller 170. As will be described further herein, ASD 150 is operably coupled to controller 170 (see dashed communications path) using any now known or later developed communications system, e.g., cellular communications, wireless, wired, or other communications network. Once gas flow 140 passes through ASD 150, it may be exhausted to atmosphere.

As noted, ASDs 150 are advantageous because they are more sensitive and allow earlier detection of fire compared to other devices such as heat detectors, flame detectors, optical smoke detectors or ionization smoke detectors. However, fires in GT system 100 may create temperatures greater than which ASDs 150 can operate. For example, fires may generate gas flow 140 temperatures greater than 120° C. (~248° F.), while ASDs 150 have a temperature limitation for intake gas of, for example, about 60° C. (~140° F.). To allow use of ASD 150 for fire detection in GT system 100, system 104 includes cooling system 164 in manifold 136 upstream of ASD 150. Cooling system 164 is also downstream of upstream temperature sensor 142 to avoid affecting any temperature sensing before that sensor.

Cooling system 164 is configured to reduce a temperature of gas flow 140 in manifold 136 to a sufficient level that ASD 150 can be used for early detection of fire, e.g., below about 60° C. (~140° F.). Cooling system 164 may include any now known or later developed cooling apparatus capable of lowering the temperature of gas flow 140 such as but not limited to a heat exchanger 166 including piping allowing gas flow 140 to come into thermal communication with a coolant (not shown). Heat exchanger 166 may include a refrigeration system or other industrial cooling apparatus capable of lowering gas flow 140 temperature to a level at which ASD 150 can operate. As will be described further herein, cooling system 164 is operably coupled to controller 170 (see dashed communications path) using any now known or later developed communications system, e.g., cellular communications, wireless, wired, or other communications network. Hence, controller 170 can control operation of cooling system 164.

System 104 also includes controller 170 in communication with upstream temperature sensor 142 and ASD 150. Controller 170 is configured to generate one of: a) a first (fire temperature) alarm in response to upstream temperature sensor 142 detecting a temperature of gas flow 140 exceeding a first temperature threshold, and b) a second (smoke) alarm in response to ASD 150 detecting smoke in gas flow 140. Based on one or both alarms, any now known or later developed corrective action may be taken, e.g., passive action or more assertive action, depending on the circumstances. For example, passive corrective actions may include but are not limited to: initiating visual verification of a cause of the alarm, activating an audible alarm, and/or performing additional monitoring. More assertive corrective actions may include but are not limited to: activating fire suppression and/or exterminating systems (e.g., sprinkler, foam or other fire exterminating systems), initiating slowdown or shutdown of GT system 100, and/or ceasing fuel delivery by fuel delivery system 114. The first temperature threshold may be any user-defined temperature for detecting fire in a respective fire risk zone, e.g., combustor can 112. In one non-limiting example, the first temperature threshold may be 120° C. (~248° F.).

The first (high temperature) alarm may indicate user-defined instructions in the form of, for example, one of: a) an excessive heat detection alarm which may require, for example, passive corrective action such as additional monitoring; b) a fire pre-alarm which may require, for example, passive corrective action such as requiring verification through other mechanisms such as visual inspection; and c) a fire alarm that requires more assertive corrective action such as fire suppression or exhaustion measures, or GT system 100 shutdown. The second (smoke) alarm may indicate user-defined instructions in the form of, for example, one of: a) a smoke detection alarm which may require, for example, passive corrective action such as additional monitoring and/or more assertive corrective action such as fire suppression or exhaustion measures, or GT system 100 shutdown; b) a fire pre-alarm which may require, for example, passive corrective action such as requiring verification through other mechanisms such as visual inspection; and c) a fire alarm that requires more assertive corrective action such as fire suppression or exhaustion measures, or GT system 100 shutdown. Controller 170 is configured, perhaps with interaction with an overall controller (not shown) of GT system 100, to implement any of the described corrective actions.

Controller 170 may also be configured to provide corrective action based on an occurrence of a combination of the 'alarm triggers,' e.g., a temperature of gas flow 140 exceeds a first temperature threshold, and ASD 150 detects smoke in gas flow 140. For example, passive corrective action may be considered when only one of the alarm triggers occurs, e.g., instructing visual verification of fire before escalating the alarm to require fire suppression or exhaustion measures. Alternatively, assertive corrective action such as fire suppression or exhaustion, as previously described, may occur only when both fire alarm triggers occur, i.e., a temperature of gas flow 140 exceeds a first temperature threshold, and ASD 150 detects smoke in gas flow 140. In addition, controller 170 may undertake different corrective actions based on the extent or scale of one or both alarm triggers, i.e., the extent of the temperature measured by upstream temperature sensor 142 compared to normal operating temperatures of gas flow 140, or the amount of smoke detected by ASD 150.

System 104 may also optionally include a safety system 180 configured to protect, among other structures, ASD 150. Safety system 180 may include a valve 182 in manifold 136 upstream of cooling system 164. Valve 182 may include any type of industrial valve capable of closing manifold 136 to stop gas flow 140 to cooling system 164 and ASD 150. Safety system 180 may also include a second, downstream temperature sensor 184 in manifold 136 downstream of cooling system 164 and upstream of ASD 150. Downstream temperature sensor 184 has at least a part thereof operatively positioned to measure a temperature of gas flow 140 in manifold 136. Downstream temperature sensor 184 may be positioned in manifold 136 in any location downstream of cooling system 164 and upstream of ASD 150. In this manner, downstream temperature sensor 184 can ensure a temperature of gas flow 140 entering ASD 150 is not above a temperature limit of ASD 150, e.g., greater than about 60° C. (~140° F.). Gas flow 140 may reach temperatures that could be damaging to ASD 150 when, for example, cooling system 164 is not functioning properly or is off, or valve 182 is closed.

Downstream temperature sensor 184 can include any form of industrial temperature sensor capable of withstanding temperatures of gas flow 140. Downstream temperature sensor 184 may include but is not limited to: thermocouples, resistance temperature detectors (RTD), thermistors and/or semiconductor based integrated circuits. Downstream temperature sensor 184 is operably coupled to controller 170 (see dashed communications path) using any now known or later developed communications system, e.g., cellular communications, wireless, wired, or other communications network.

Regarding safety system 180, controller 170 may be further configured to generate a third (ASD safety) alarm in response to downstream temperature sensor 184 detecting a temperature of gas flow 140 exceeding a second temperature threshold. The second temperature threshold may be any user-defined temperature at which protection of ASD 150 is deemed warranted, e.g., about 60° C. (~140° F.). The third (ASD safety) alarm may take the form of, for example, a visual or audible alarm, which may direct passive corrective action such as manual monitoring or checking of cooling system 164. In addition, or alternatively thereto, controller 170 may be further configured to close valve 182 and/or to shut off ASD 150 in response to the second temperature sensor 184 detecting the temperature of gas flow 140 exceeding the second temperature threshold. In this manner, ASD 150 can be protected from excessive temperatures.

System 104 can be customized for a wide variety of GT systems 100. That is, pipe intake ports 130, manifold 136 and/or pipes 132, cooling system 164, and ASD 150, among other structures of system 104, can take a variety of configurations for early fire detection in GT system 100 and/or gas turbine enclosure 102. For example, all of the parts of system 104 can be scaled for different sized GT systems 100. In another example, parts of system 104 can be duplicated to allow customized fire detection for different fire risk zones. In FIGS. 1 and 2, for example, plurality of fire risk zones includes an area proximate to at least some of plurality of combustor cans 112 of GT system 100. In FIG. 4, plurality of fire risk zones includes an area proximate to each combustor can 112 of GT system 100.

Figure 5:
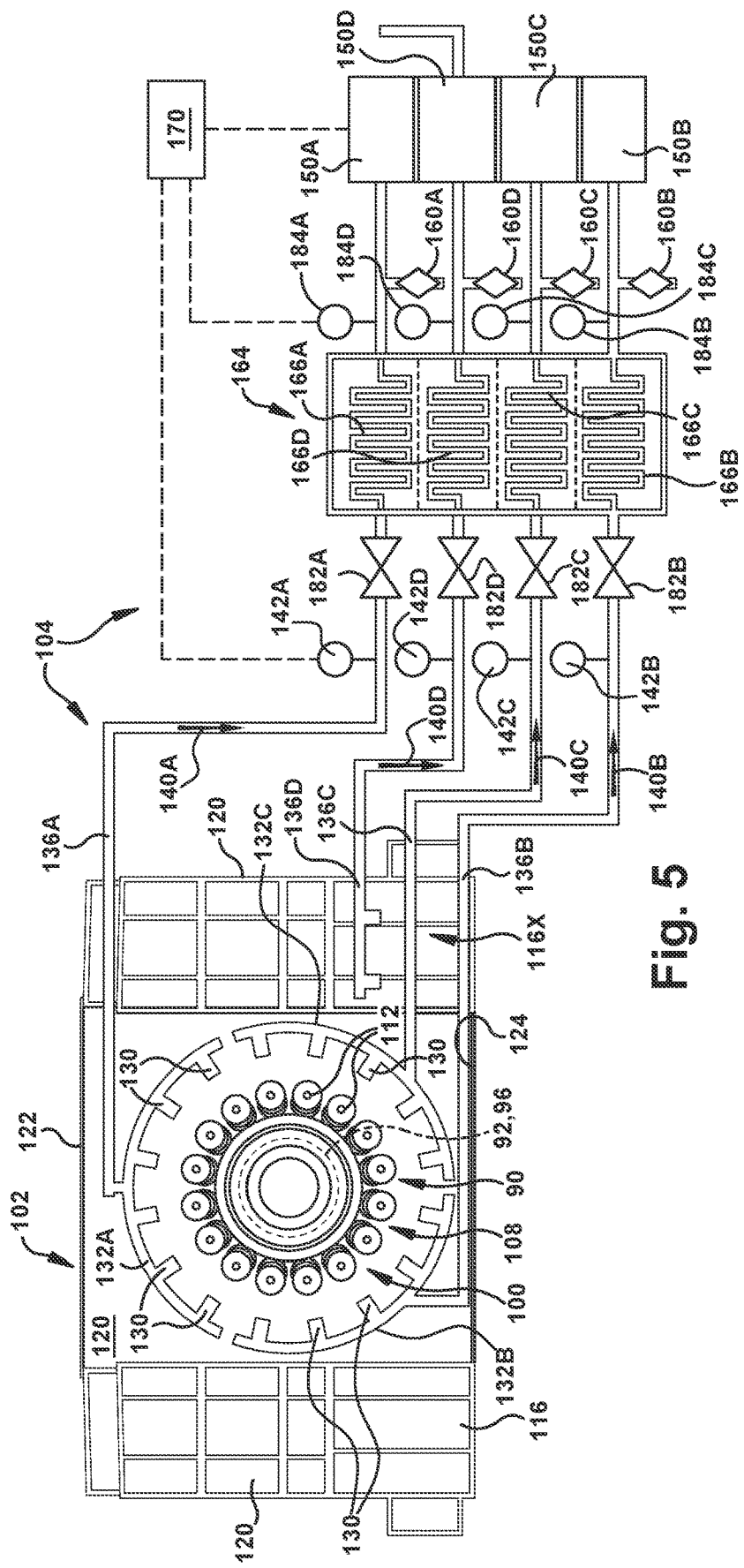
FIG. 5 shows a schematic cross-sectional view of an end of a combustion section of a gas turbine system with a fire detection system according to embodiments of the disclosure.
Figure 6:
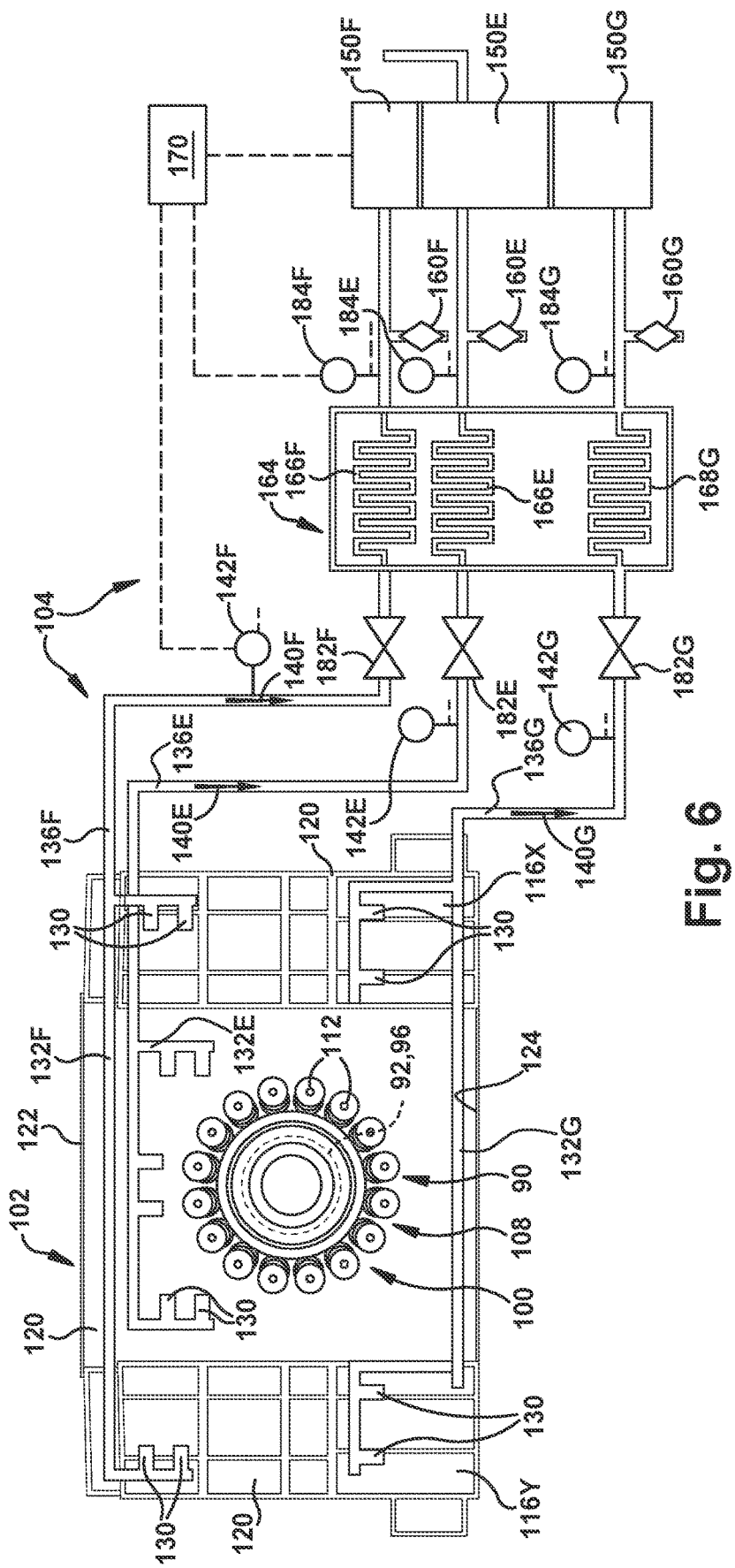
FIG. 6 shows a schematic cross-sectional view of an end of a combustion section of a gas turbine system with a fire detection system according to embodiments of the disclosure.

FIGS. 5 and 6 show schematic views of systems 104 including duplicated parts to isolate different fire risk zone(s) for fire detection than in FIGS. 1 and 2. In FIG. 5, four fire risk zones, generally labeled A-D, are created; and in FIG. 6, three fire risk zones, generally labeled E-G, are created. In FIG. 5, fire risk zone A includes one third of combustor cans 112; fire risk zone B includes another third of combustor cans 112; fire risk zone C includes the last third of combustor cans 112; and fire risk zone D includes part of a fire module 116X. In FIG. 6, fire risk zone E includes an upper portion of combustor 108, e.g., near some of combustor cans 112; fire risk zone F includes an upper portion of both fuel modules 116X, 116Y; and fire risk zone G includes a lower portion of both fuel modules 116X, 116Y.

In these examples, manifold 136 may include a plurality of manifolds 136A-D (FIG. 5), 136E-G (FIG. 6), and each manifold 136A-G is in fluid communication with at least one intake port 130 and includes a respective first temperature sensor 142A-D (FIG. 5), 142E-G (FIG. 6). In FIGS. 5 and 6, an ASD 150A-D (FIG. 5) or 150E-G (FIG. 6) is shown for each gas flow 140A-D (FIG. 5) or 140E-G (FIG. 6). In this manner, each ASD 150A-D (FIG. 5) or 150E-G (FIG. 6) creates a respective gas flow 140A-D (FIG. 5) or 140E-G (FIG. 6) and detects smoke in a respective gas flow 140A-D (FIG. 5) or 140E-G (FIG. 6). In FIGS. 5 and 6, a single cooling system 164 is shown with multiple heat exchangers 166A-D (FIG. 5) or 166E-G (FIG. 6). In these embodiments, each heat exchanger 166A-D (FIG. 5) or 166E-G (FIG. 6) may provide a customized heat reduction depending, for example, on the anticipated temperature of gas flow 140A-D (FIG. 5) or 140E-G (FIG. 6) drawn therethrough. It will be recognized that each fire risk zone may alternatively include its own segregated cooling system 164 (see dashed lines within box labeled 164 in FIG. 5) with its own heat exchanger 166, perhaps with each cooling system providing a customized heat reduction depending, for example, on the anticipated temperature of gas flow 140A-D (FIG. 5) or 140E-G (FIG. 6) drawn therethrough.

In FIGS. 5 and 6, system 104 includes pipe intake ports 130 proximate each of the plurality of fire risk zones A-G. At least one manifold 136A-D (FIG. 5) or 136E-G (FIG. 6) is in fluid communication with at least one of pipe intake ports 130. A first temperature sensor 142A-D (FIG. 5) or 142E-G (FIG. 6) is positioned in each manifold 136A-D (FIG. 5) or 136E-G (FIG. 6), as described herein upstream of valve 182. System 104 also includes cooling system 164 (and perhaps multiple cooling systems) downstream of first temperature sensors 142A-D (FIG. 5) or 142E-G (FIG. 6) in each manifold 136A-D (FIG. 5) or 136E-G (FIG. 6). As noted, cooling system(s) 164 is/are configured to reduce a temperature of gas flow 140A-D (FIG. 5) or 140E-G (FIG. 6) in a respective manifold 136A-D (FIG. 5) or 136E-G (FIG. 6). An ASD 150A-D (FIG. 5) or 150E-G (FIG. 6) is downstream of cooling system(s) 164 in respective manifold 136A-D (FIG. 5) or 136E-G (FIG. 6). As noted, each ASD 150A-G (FIGS. 5-6) is configured to create a respective gas flow 140A-G (FIGS. 5-6) through a respective manifold 136A-G (FIGS. 5-6) and detect smoke in the respective gas flow 140A-G (FIGS. 5-6).

Controller 170 is in communication with each first temperature sensor 142A-D (FIG. 5) or 142E-G (FIG. 6) and each ASD 150A-D (FIG. 5) or 150E-G (FIG. 6). In operation, controller 170 is configured to generate one or both of: a) the first alarm in response to any first temperature sensor 142A-D (FIG. 5), 142E-G (FIG. 6) detecting a temperature of gas flow 140A-D (FIG. 5), 140E-G (FIG. 6) in a respective manifold 136A-D (FIG. 5), 136E-G (FIG. 6) exceeding the first temperature threshold, and b) the second alarm in response to any aspirating smoke detector 150A-D (FIG. 5), 150E-G (FIG. 6) detecting smoke in a respective gas flow 140A-D (FIG. 5), 140E-G (FIG. 6) in a respective manifold 136A-D (FIG. 5), 136E-G (FIG. 6). As will be described further, each fire risk zone A-G may have its own first temperature threshold and smoke detection threshold.

System 104 in FIGS. 5 and 6 also includes safety systems (not labeled for clarity). Each safety system includes valve 182A-D (FIG. 5), 182E-G (FIG. 6) in each manifold 136A-D (FIG. 5), 136E-G (FIG. 6) upstream of a respective cooling system(s) 164. System 104 also includes second temperature sensor 184A-D (FIG. 5), 184E-G (FIG. 6) in each manifold 136A-D (FIG. 5), 136E-G (FIG. 6) downstream of a respective cooling system(s) 164 and upstream of a respective ASD 150A-D (FIG. 5), 150E-G (FIG. 6). Here, controller 170 is further configured to generate a third (ASD safety) alarm in response to the respective second temperature sensor 184A-D (FIG. 5), 184E-G (FIG. 6) detecting a temperature of a respective gas flow 140A-D (FIG. 5), 140E-G (FIG. 6) exceeding the second temperature threshold. Controller 170 may be further configured to close a respective valve 182A-D (FIG. 5), 182E-G (FIG. 6) and to shut off the respective ASD 150A-D (FIG. 5), 150E-G (FIG. 6) in response to the second temperature sensor detecting the temperature of the respective gas flow 140A-D (FIG. 5), 140E-G (FIG. 6) in the respective manifold 136A-D (FIG. 5), 136E-G (FIG. 6) exceeding the second temperature threshold. Controller 170 can also control cooling system(s) 164 in any manner to protect ASDs 150A-G.

In addition to the different structures, system 104 may also implement different temperature thresholds for different fire risk zones, e.g., fire risk zones A-D (FIG. 5), or for different GT systems 100. More particularly, where more than one fire risk zone is present, the first temperature threshold may vary depending on the particular fire risk zone in question. For example, fire adjacent a combustor can 112 can have a different temperature than fire in a fuel module 116, necessitating different first temperature thresholds. In this manner, the first (high temperature) alarm may require a first temperature threshold of, e.g., 218° C. (~425° F.) for fire risk zones around combustor can(s) 112, but a different first temperature threshold of, e.g., 162° C. (~325° F.) for fire risk zones in fuel module(s) 116. Different GT systems 100 of different sizes or those using different fuel types may require different first temperature thresholds.

Similarly, where more than one fire risk zone is present, the smoke particle concentration required to cause a respective ASD, e.g., ASDs 150A-D (FIG. 5), to 'detect' smoke and controller 170 to generate a second (smoke) alarm may vary depending on the particular fire risk zone in question. For example, fire adjacent a combustor can 112 can generate smoke having a lower smoke particle concentration than fire in a fuel module 116, necessitating different smoke detection particle concentration thresholds. Different GT systems 100 of different sizes or those using different fuel types may require different smoke particle concentration thresholds.

While FIGS. 5-6 show two embodiments of system 104 with fire detection in more than one fire risk zone, it is emphasized that a wide variety of alternative arrangements with fire detection in numerous alternative fire risk zones are possible and within the scope of the disclosure.

Figure 7:
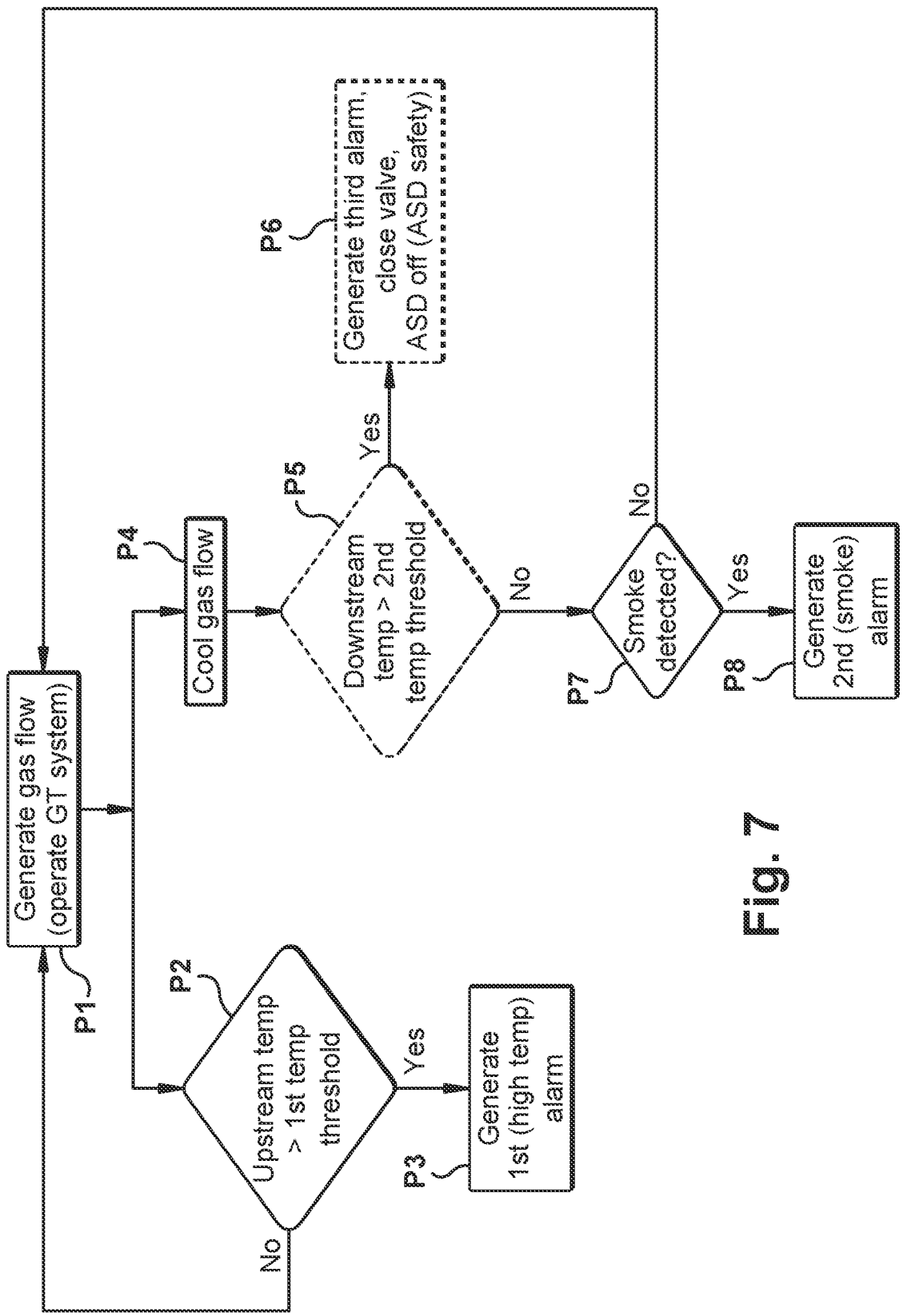
FIG. 7 shows a flow diagram of a method of detecting fire in a gas turbine system or a gas turbine enclosure according to embodiments of the disclosure.

FIG. 7 shows a flow diagram of an operational methodology of system 104. While FIG. 7 is described mostly relative to a single fire risk zone, it will be recognized that the method described can be repeated for a plurality of fire risk zones, as previously described herein. In process P1, system 104 generates gas flow 140 in manifold 136 from at least one of the plurality of fire risk zones using an ASD 150 (e.g., by drawing air into manifold 136). GT system 100 is operational during process P1. In processes P2-P3, system 104, e.g., controller 170, generates a first (high temperature) alarm in response to first temperature sensor 142 in manifold 136 detecting a temperature of gas flow 140 exceeding a first temperature threshold. That is, if a temperature of gas flow 140 exceeds a first temperature threshold, i.e., Yes at process P2, then at process P3, controller 170 generates the first alarm. If a temperature of gas flow 140 does not exceed a first temperature threshold, i.e., No at process P2, then no fire is present, and processing continues with process P1. As noted previously, the first (high temperature) alarm may indicate user-defined instructions of, for example, one of: a) an excessive heat detection alarm which may require, for example, passive corrective action such as additional monitoring; b) a fire pre-alarm which may require, for example, passive corrective action such as requiring verification through other mechanisms such as visual inspection; and c) a fire alarm that requires more assertive corrective action such as fire suppression or exhaustion measures, or GT system 100 shutdown. Controller 170 is configured, perhaps with interaction with an overall controller (not shown) of GT system 100, to implement any of the described corrective actions.

Simultaneously to processes P1-P3, in process P4, system 104 cools gas flow 140 downstream of first temperature sensor 142 and upstream of ASD(s) 150 using cooling system(s) 164.

Processes P5-P6 describe operation of safety system 180, where one is provided. In processes P5-P6, system 104, e.g., controller 170, generates a third (ASD safety) alarm in response to a second temperature sensor 184 in manifold 136 detecting a temperature of gas flow 140 exceeding a second temperature threshold. That is, if a temperature of gas flow 140 exceeds a second temperature threshold, i.e., Yes at process P5, then at process P6, controller 170 generates the third alarm. If a temperature of gas flow 140 does not exceed second temperature threshold, i.e., No at process P5, then gas flow 140 is sufficiently cool for ASD 150, and processing continues with process P7. In addition, in process P6 (i.e., an ASD safety step), controller 170 may close valve 182 in manifold 136 upstream of cooling system 164 and shut off ASD 150 to cease generation of gas flow 140 and the detection of smoke. As previously noted, the second temperature threshold may be any user-defined temperature at which protection of ASD 150 is deemed warranted. As noted, the third (ASD safety) alarm may include user-defined formats such as a visual or audible alarm, which may direct passive corrective action such as manual monitoring or checking of cooling system 164. In this manner, ASD 150 can be protected from excessive temperatures.

If a temperature of gas flow 140 does not exceed a second temperature threshold, i.e., No at process P5, in processes P7-P8, controller 170 may generate a second (smoke) alarm in response to ASD 150 detecting smoke in gas flow 140. More particularly, in process P7, ASD 150 determines whether smoke is present in gas flow 140, e.g., whether smoke particle concentration exceeds a threshold. If smoke is detected, i.e., Yes at process P7, then at process P8 (smoke alarm process), controller 180 generates the second (smoke) alarm. As noted previously, the second (smoke) alarm may indicate user-defined instructions of, for example, one of: a) a smoke detection alarm which may require, for example, passive corrective action such as additional monitoring and/or more assertive corrective action such as fire suppression or exhaustion measures, or GT system 100 shutdown; b) a fire pre-alarm which may require, for example, passive corrective action such as requiring verification through other mechanisms such as visual inspection; and c) a fire alarm that requires more assertive corrective action such as fire suppression or exhaustion measures, or GT system 100 shutdown. Controller 170 is configured, perhaps with interaction with an overall controller (not shown) of GT system 100, to implement any of the described corrective actions. If smoke is not detected, i.e., No at process P7, then no fire is present, and processing continues with process P1.

Embodiments of the disclosure provide various technical and commercial advantages, examples of which are discussed herein. System 104 provides early fire detection in GT systems 100 and/or gas turbine enclosures 102 by providing a mechanism to allow use of ASD(s). The system also uses high temperature detection in addition to smoke detection for early warning of a fire. A safety system may also be used to protect sensitive ASDs. Embodiments of the disclosure can be retrofitted to current GT systems or used with new installations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," is not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of fire detection for a system comprising:
   a gas turbine system, the gas turbine system surrounded by an enclosure and including a plurality of fire risk zones; and
   a fire detection system, the fire detection system comprising:
      a respective pipe intake port proximate to each of the plurality of fire risk zones, the pipe intake ports within the enclosure;
      a manifold in fluid communication with at least one of the pipe intake ports;
      a first temperature sensor positioned in the manifold;
      a cooling system in the manifold downstream of the first temperature sensor, the cooling system configured to reduce a temperature of a gas flow in the manifold;
      an aspirating smoke detector in the manifold downstream of the cooling system, the aspirating smoke detector configured to draw the gas flow through the manifold and detect smoke in the gas flow; and a controller in communication with the first temperature sensor and the aspirating smoke detector, the controller configured to generate one of: a) a first alarm in response to the first temperature sensor detecting a temperature of the gas flow exceeding a first temperature threshold, and b) a second alarm in response to the aspirating smoke detector detecting smoke in the gas flow, the method comprising:

generating the gas flow in the manifold from at least one of the plurality of fire risk zones using the aspirating smoke detector;

generating the first alarm in response to the first temperature sensor in the manifold detecting the temperature of the gas flow exceeding the first temperature threshold;

cooling the gas flow downstream of the first temperature sensor and upstream of the aspirating smoke detector using the cooling system; and generating the second alarm in response to the aspirating smoke detector detecting smoke in the gas flow.

2. The method of claim 1, further comprising generating a third alarm in response to a second temperature sensor downstream of the cooling system and upstream of the aspirating smoke detector detecting the temperature of the gas flow exceeding a second temperature threshold.

3. The method of claim 2, further comprising, in response to the second temperature sensor detecting the temperature of the gas flow exceeding the second temperature threshold, closing a valve in the manifold upstream of the cooling system and shutting off the aspirating smoke detector to cease generation of the gas flow and detection of the smoke.

4. A system comprising:

a gas turbine system, the gas turbine system surrounded by an enclosure and including a plurality of fire risk zones; and a fire detection system, the fire detection system comprising:
   a respective pipe intake port proximate to each of the plurality of fire risk zones, the pipe intake ports within the enclosure;
   a manifold in fluid communication with at least one of the pipe intake ports;
   a first temperature sensor positioned in the manifold;
   a cooling system in the manifold downstream of the first temperature sensor, the cooling system configured to reduce a temperature of a gas flow in the manifold;
   an aspirating smoke detector in the manifold downstream of the cooling system, the aspirating smoke detector configured to draw the gas flow through the manifold and detect smoke in the gas flow; and
   a controller in communication with the first temperature sensor and the aspirating smoke detector, the controller configured to generate one of: a) a first alarm in response to the first temperature sensor detecting a temperature of the gas flow exceeding a first temperature threshold, and b) a second alarm in response to the aspirating smoke detector detecting smoke in the gas flow.

5. The system of claim 4, further comprising a safety system including:
a valve in the manifold upstream of the cooling system; and a second temperature sensor in the manifold downstream of the cooling system and upstream of the aspirating smoke detector, and wherein the controller is further configured to generate a third alarm in response to the second temperature sensor detecting a temperature of the gas flow exceeding a second temperature threshold.

6. The system of claim 5, wherein the controller is further configured to close the valve and to shut off the aspirating smoke detector in response to the second temperature sensor detecting the temperature of the gas flow exceeding the second temperature threshold.

7. The system of claim 4, wherein the first alarm includes one of: an excessive heat detection alarm, a fire pre-alarm, and a fire alarm.

8. The system of claim 4, wherein the second alarm includes one of: a smoke detection alarm, a fire pre-alarm, and a fire alarm.

9. The system of claim 4, further comprising a filter upstream of the aspirating smoke detector.

10. The system of claim 4, wherein the plurality of fire risk zones includes an area proximate to at least some of a plurality of combustor cans of the gas turbine system.

11. The system of claim 10, wherein the plurality of fire risk zones further includes an area proximate to at least one fuel module of the gas turbine system.

12. The system of claim 4, wherein the manifold extends outside the enclosure; and wherein the first temperature sensor, the cooling system, the aspirating smoke detector, and the controller are outside the enclosure.

13. The system of claim 4, wherein the manifold includes a plurality of manifolds, each manifold in fluid communication with at least one pipe intake port and including a respective first temperature sensor, a respective cooling system, and a respective aspirating smoke detector; and wherein the controller is in communication with each respective first temperature sensor and each respective aspirating smoke detector, the controller configured to generate one of: a) the first alarm in response to any of the respective first temperature sensors detecting a temperature of the gas flow in a respective manifold exceeding the first temperature threshold, and b) the second alarm in response to any aspirating smoke detector detecting smoke in the gas flow in a respective manifold.

14. A system comprising:

a gas turbine system, the gas turbine system surrounded by an enclosure and including a plurality of fire risk zones; and a fire detection system, the fire detection system comprising:
   a respective pipe intake port proximate to each of the plurality of fire risk zones, the pipe intake ports within the enclosure;
   at least one manifold in fluid communication with at least one of the pipe intake ports;
   a first temperature sensor positioned in each manifold;
   a cooling system in each manifold downstream of the first temperature sensor, each cooling system configured to reduce a temperature of a gas flow in a respective manifold;
   a valve in each manifold upstream of a respective cooling system;
   an aspirating smoke detector in each manifold downstream of the cooling system, the aspirating smoke detector configured to draw a respective gas flow through a respective manifold and detect smoke in the respective gas flow; and a controller in communication with each first temperature sensor and each aspirating smoke detector, the controller configured to generate one of: a) a first alarm in response to any first temperature sensor detecting a temperature of the gas flow exceeding a first temperature threshold, and b) a second alarm in response to any aspirating smoke detector detecting smoke in the respective gas flow; and wherein the controller is further configured to close a respective valve and to shut off the aspirating smoke detector in response to the second temperature sensor detecting the temperature of the gas flow in the respective manifold exceeding a second temperature threshold.

15. The system of claim 14, further comprising a safety system including:

a second temperature sensor in each manifold downstream of a respective cooling system and upstream of a respective aspirating smoke detector, and wherein the controller is further configured to generate a third alarm in response to the respective second temperature sensor detecting a temperature of the gas flow exceeding the second temperature threshold.

16. The system of claim 14, wherein, in each respective manifold, the valve is downstream of the first temperature sensor.

17. The system of claim 14, wherein the first alarm includes one of: an excessive heat detection alarm, a fire pre-alarm, and a fire alarm.

18. The system of claim 14, wherein the second alarm includes one of: a smoke detection alarm, a fire pre-alarm, and a fire alarm.

19. The system of claim 14, further comprising a respective filter upstream of each aspirating smoke detector.

20. The system of claim 14, wherein the plurality of fire risk zones includes an area proximate to at least some of a plurality of combustor cans of the gas turbine system; an area proximate to at least one fuel modules of the gas turbine system; or both.

* * * * *